United States Patent

Kanda

[11] Patent Number: 5,813,665
[45] Date of Patent: Sep. 29, 1998

[54] FLUID-FILLED CYLINDRICAL ELASTIC MOUNT INCLUDING SYNTHETIC RESIN INTERMEDIATE SLEEVE HAVING INTEGRALLY FORMED STOPPERS

[75] Inventor: Ryouji Kanda, Komaki, Japan

[73] Assignee: Tokai Rubber Technologies, Ltd., Japan

[21] Appl. No.: 715,389

[22] Filed: Sep. 13, 1996

[30] Foreign Application Priority Data

Sep. 29, 1995 [JP] Japan .................................. 7-252631

[51] Int. Cl.⁶ .......................................................... F16F 9/00
[52] U.S. Cl. ...................................... 267/219; 267/140.12
[58] Field of Search ........................ 267/140.12, 140.15, 267/219, 220, 35; 180/300, 312; 248/562, 636

[56] References Cited

U.S. PATENT DOCUMENTS

| 4,702,346 | 10/1987 | Uno et al. . |
| 5,178,373 | 1/1993 | Takeguchi et al. ................ 267/140.12 |
| 5,228,662 | 7/1993 | Kojima et al. .................... 267/140.12 |

FOREIGN PATENT DOCUMENTS

| 64-3141 | 1/1989 | Japan . |
| 3-30736 | 5/1991 | Japan . |
| 6-71937 | 10/1994 | Japan . |
| 7-167198 | 7/1995 | Japan . |

OTHER PUBLICATIONS

Patent Abstracts of Japan, Nov. 27, 1992, vol. 16, No. 557, JP 4–211742 (A) Fujinami.

*Primary Examiner*—Lee W. Young
*Attorney, Agent, or Firm*—Parkhurst & Wendel, L.L.P

[57] ABSTRACT

An elastic mount having diametrically opposed pressure-receiving and equilibrium chambers communicating with each other through an orifice passage. An intermediate sleeve is made of a synthetic resin and connected to a center shaft member through an elastic body that includes an arcuate portion partly defining the pressure-receiving chamber. An integral first stopper extends into the pressure-receiving chamber, and further includes a bridging portion which partly defines the equilibrium chamber and which includes an integral second stopper extending into a void formed through the elastic body. The first and second stoppers are opposed to each other in a diametric direction from which the two chambers are opposed to each other.

10 Claims, 3 Drawing Sheets

FLUID-FILLED CYLINDRICAL ELASTIC MOUNT INCLUDING SYNTHETIC RESIN INTERMEDIATE SLEEVE HAVING INTEGRALLY FORMED STOPPERS

BACKGROUND OF THE INVENTION

1. Field of the Invention

The present invention relates generally to a cylindrical elastic mount such as engine mounts, differential mounts, member mounts and suspension bushings for motor vehicles, and more particularly to fluid-filled cylindrical elastic mounts which exhibit a damping effect primarily with respect to a vibrational load received in a diametric direction, based on flows of a non-compressible fluid contained therein, and which are provided with a stopper mechanism for limiting the amount of relative displacement of two members flexibly connected by the mount.

2. Discussion of the Related Art

Laid-open Publication JP-B-3-30736 of examined Japanese Patent Application discloses a fluid-filled cylindrical elastic mount, as one type of a vibration damper interposed between two members of a vibration system. This fluid-filled cylindrical elastic mount includes (a) a center shaft member, (b) an intermediate sleeve disposed radially outwardly of the center shaft member and having a first and a second window, (c) a generally annular elastic body interposed between the center shaft member and the intermediate sleeve for elastically connecting the center shaft member and the intermediate sleeve, the elastic body having a first and a second pocket formed at respective circumferential positions thereof that are opposed to each other in a diametric direction thereof, the first and second pockets being open on an outer circumferential surface of the intermediate sleeve through the first and second windows, respectively, (d) an outer sleeve sleeve fitted on the intermediate sleeve so as to close the first and second windows, and cooperating with the first pocket to define a pressure-receiving chamber which is filled with a non-compressible fluid and which receives a vibrational load in the diametric direction, (e) a flexible diaphragm cooperating with the second pockets and the second pocket to define an equilibrium chamber which is filled with said fluid and whose volume is variable, and (f) means for defining an orifice passage for fluid communication between the pressure-receiving and the equilibrium chambers, and wherein the elastic body has a void formed through a portion thereof between the center shaft member and the equilibrium chamber, over an entire axial length of the elastic body. This fluid-filled cylindrical elastic mount exhibits a damping effect primarily with respect to a vibrational load received in the diametric direction in which the pressure-receiving and equilibrium chambers are opposed to each other. For example, the elastic mount is suitably used as an engine mount for a front-engine front-drive motor vehicle.

Such a fluid-filled cylindrical elastic mount is generally required to be constructed for permitting the orifice passage to have a sufficient length, to assure a relatively high degree of freedom of adjustment of the damping characteristics based on the fluid flows, and to improve the damping effect based on the fluid flows. In an attempt to satisfy this requirement, it is proposed to use an appropriate member exclusively for forming an orifice passage having a sufficient length, as disclosed in laid-open Publication JP-U-1-3141 of Japanese Utility Model Application. However, the exclusive use of such a member for forming the orifice passage increases the number of the required components, structural complexity and cost. of manufacture of the elastic mount, and deteriorates the efficiency of the manufacture.

In the fluid-filled cylindrical elastic mount as described above, it is desirable to provide a stop mechanism for limiting the amount of radial relative displacement of the center shaft member and the outer sleeve, upon application of an excessively large vibrational load, for thereby limiting the amount of elastic deformation of the elastic body and the amount of relative displacement of the members to be flexibly connected by the mount. To this end, it is proposed to provide stopper members which extend from a center shaft member toward an outer sleeve, as disclosed in the above-identified Publication JP-U-1-3141. The exclusive use of such stopper members also causes the above-indicated problem, namely, increases the number of the required components, structural complexity and cost of manufacture of the elastic mount, and deteriorates the efficiency of the manufacture.

To deal with the above problem, the assignee of the present application proposed a fluid-filled elastic mount as disclosed in laid-open Publication JP-U-6-71937 of Japanese Utility Model Application, wherein the intermediate sleeve made of metal has an arcuate portion which defines one of the circumferentially opposite edges of the first window and which closes the opening of the corresponding first pocket of the elastic body over a circumferential length slightly larger than a half of the entire circumferential dimension of the first pocket. This arcuate portion of the intermediate sleeve is covered at its outer surface by a rubber layer which has a U-groove closed by the outer sleeve so as to define the orifice passage. The arcuate portion is provided at its circumferential free end with a stopper mechanism opposed to the center shaft member. This cylindrical elastic mount utilizes the intermediate sleeve for forming the sufficiently long orifice passage and providing the stopper mechanism, and does not use separate members exclusively for these purposes.

However, a further study by the present inventor recognized drawbacks of the fluid-filled cylindrical elastic mount disclosed in JP-U-6-71937, that is, easy plastic deformation of the rubber layer on the arcuate portion of the intermediate sleeve, resulting change of the cross sectional shape of the orifice passage, and consequent deterioration of the damping effect exhibited by the mount. Further, since the intermediate sleeve is generally from a tubular or sheet member and has a relatively small wall thickness, the arcuate portion extending in the circumferential direction of the intermediate sleeve does not assure a sufficient degree of strength of the stop mechanism, and suffers from difficulty in suitably adjusting the distance between the stopper mechanism and the center shaft member. Thus, the fluid-filled cylindrical mount described above should be further improved to overcome the drawbacks addressed above.

SUMMARY OF THE INVENTION

It is therefore an object of the present invention to provide a fluid-filled cylindrical elastic mount having an improved construction which provides a stopper mechanism having a sufficient degree of strength without using an exclusive member, and which permits easy adjustment of the distance between the stopper mechanism and the center shaft member.

It is a principal optional object of this invention to provide such a fluid-filled cylindrical elastic mount which is constructed so as to permit easy formation of a sufficiently long orifice passage, without using an exclusive member, and which is adapted to prevent a change in the cross sectional shape of the orifice passage.

The above principal object may be achieved according to the principle of the present invention, which provides fluid-filled cylindrical elastic mount including (a) a center shaft member, (b) an intermediate sleeve member disposed radially outwardly of the center shaft member and having a first and a second window, (c) a generally annular elastic body interposed between the center shaft member and the intermediate sleeve member for elastically connecting the center shaft member and the intermediate sleeve member, the elastic body having a first and a second pocket formed at respective circumferential positions thereof that are opposed to each other in a diametric direction thereof, the first and second pockets being open on an outer circumferential surface of the intermediate sleeve member through the first and second windows, respectively, (d) an outer sleeve member fitted on the intermediate sleeve member so as to close the first and second windows, and cooperating with the first pocket to define a pressure-receiving chamber which is filled with a non-compressible fluid and which receives a vibrational load in the diametric direction, (e) a flexible diaphragm cooperating with the second pocket to define an equilibrium chamber which is filled with the fluid and whose volume is variable, and (f) means for defining an orifice passage for fluid communication between the pressure-receiving and the equilibrium chambers, and wherein the elastic body has a void formed through a portion thereof between the center shaft member and the equilibrium chamber, over an entire axial length of the elastic body, the fluid-filled cylindrical elastic mount being characterized in the intermediate sleeve member is made of a synthetic resin, and includes an arcuate portion and a bridging portion. The arcuate portion extends in a circumferential direction of the intermediate sleeve member, from one of opposite ends of the first pocket which are opposed to each other in the circumferential direction, toward the other of the opposite ends. The arcuate portion defines one of opposite edges of an opening of the first window which corresponds to the above-indicated one end of the first pocket. The arcuate portion includes a first stopper formed as an integral part thereof. The first stopper extends from an inner surface of the arcuate portion into the pressure-receiving chamber in the diametric direction and is spaced from the center shaft member by a first predetermined distance in the diametric direction. On the other hand, the bridging portion extends in an axial direction of the intermediate sleeve member between axial opposite edges of an opening of the second window. The bridging portion is located at an intermediate portion of the second pocket as seen in the circumferential direction of the intermediate sleeve member, and is inwardly spaced apart from the outer sleeve member in the diametric direction. The bridging portion includes a second stopper formed as an integral part thereof. The second stopper extends from an inner surface of the bridging portion into the void in the diametric direction and is spaced from the center shaft member by a second predetermined distance in the diametric direction. The first and second stoppers are disposed on opposite sides of the center shaft member as seen in the diametric direction.

In the fluid-filled cylindrical elastic mount of the present invention constructed as described above, the intermediate sleeve member is a formed body made of a suitable synthetic resin material. Unlike an intermediate sleeve member formed from a metallic tubular or sheet member, the synthetic resin intermediate sleeve member used in the present elastic mount has a sufficiently high degree of freedom in designing in terms of its configuration and dimensions. For instance, the synthetic resin intermediate sleeve member may be easily locally thick-walled for increased strength at a desired portion, or may be easily formed with a recessed or projecting portion as an integral part thereof at a desired position. Thus, the synthetic resin intermediate sleeve member may be formed with desired configuration and dimensions, without additional process steps and an increase in the cost of manufacture.

Thus, the synthetic resin intermediate sleeve member may easily and economically provided with the integral first and second stoppers described above, so as to give these stoppers with a sufficient strength, by simply increasing the wall thickness at the appropriate circumferential portions (namely, arcuate and bridging portions described above) of the intermediate sleeve member, which are opposed to the center shaft member in the diametric direction in which the pressure-receiving and equilibrium chambers are opposed to each other. The first and second stoppers function to limit the amount of relative displacement of the center shaft member and the outer sleeve member. The distances between the first and second stoppers and the center shaft member in the radial direction of the mount may be easily adjusted by suitably determining the radial dimensions of the stoppers.

In the present fluid-filled cylindrical elastic mount, the intermediate sleeve member is effectively utilized as means for providing the first and second stoppers in opposed relationship with the center shaft member, for limiting the amount of relative displacement of the center shaft member and the outer sleeve member in the load-receiving diametric direction, without using any members exclusively functioning as a stopper mechanism. Further, the intermediate sleeve member made of a synthetic resin assures a sufficient degree of strength of the stoppers and facilitates the adjustment of the radial distances of the stoppers to the center shaft member.

Although the present fluid-filled elastic mount may use a suitable member disposed on the outer circumferential surface of the intermediate sleeve member for forming the orifice passage, the orifice passage may be provided by utilizing the intermediate sleeve member, according to one preferred form of this invention, wherein the intermediate sleeve member includes a circumferential portion which includes the arcuate portion and which has a groove formed on an outer surface thereof. The groove communicates with the pressure-receiving and equilibrium chambers, and the outer sleeve member closes an opening of the groove, whereby the orifice passage is provided.

In the above preferred form of the invention wherein the orifice passage is partially defined by the groove formed in the relatively rigid synthetic resin intermediate sleeve member, the orifice passage is protected against undesirable deformation, and can be formed with a desired length, without the use of an exclusive member. Since the orifice passage can be tuned as needed, the elastic mount exhibits an excellent vibration damping effect based on flows of the fluid through the orifice passage.

As described above, the optional object indicated above may be suitably achieved according to the above preferred form of the invention.

In the present fluid-filled cylindrical elastic mount, a rubber damper is interposed between the center shaft portion and the first and second stoppers, for alleviating an impact upon abutting contact of the stoppers with the center shaft member. A compressive stress and resulting deformation of the rubber damper due to the above abutting contact tend to be concentrated on a portion of the rubber damper which is aligned with or located near a straight line which passes the axis or center of the center shaft member in the diametric direction in which the two stoppers are opposed to each other and in which the stoppers and the center shaft member are displaced relative to each other. The concentration of the stress and deformation on the above-indicated portion of the rubber damper may cause damaging or fracture of that portion.

In the light of the above fact, it is desirable to form at least one of the first and second stoppers according to another preferred form of this invention, wherein at least one of the first and second stoppers has an arcuate recess formed on an end face thereof which is opposed to an outer circumferential surface of the center shaft member. The arcuate recess extends over an entire length of each of the above-indicated at least one of the first and second stoppers in an axial direction of the intermediate sleeve member, and has a radius of arc smaller than a radius of the center shaft member.

While the arcuate recess may be formed over the entire area of the end face of the stopper opposed to the center shaft member, the end portions of the arc of the arcuate recess may be desirably contiguous with flat surfaces, or curved surfaces whose radius of arc is larger than the radius of the center shaft member.

The arcuate recess formed on the end face of the stopper results in increasing the surface areas of uniform abutting contact of the end face of the stopper with the outer circumferential surface of the center shaft member, since the arcuate recess increases the distance between the end face of the stopper and the outer circumferential surface of the center shaft member at a position on a straight line which passes the center of the center shaft member in the diametric direction in which the stopper and the center shaft member are opposed to each other. Since the radius of arc of the arcuate recess is smaller than the radius of the center shaft member, the distance between the end face of the stopper and the outer circumferential surface of the center shaft member is slightly larger at the position on the above-indicated straight line, than at the other positions corresponding to the end portions of the arc of the arcuate recess. Accordingly, the compressive stress of the rubber damper is not concentrated on its portion corresponding to the central portion of the end face of the stopper, and is substantially evenly distributed over the entire area of contact of the rubber damper with the surface of the arcuate recess, whereby the rubber damper is protected against fracture or other damage due to the stress concentration, and the durability of the rubber damper is improved.

The term "arcuate" used in connection to the arcuate recess should not be interpreted to mean an arc of a circle in a strict sense. Namely, the arcuate recess may have a generally arcuate shape in cross section, such as an elliptical shape, provided the substantive radius of curvature is smaller than the radius of the center shaft member. While the substantive radius of arc or curvature of the arcuate recess is required to be smaller than the radius of the center shaft member, the intended result would not be obtained if the radius of arc or curvature of the arcuate recess is excessively small. In this respect, the radius of arc of the arcuate recess is desirably larger than one-fifth of the radius of the center shaft member. The depth of the arcuate recess in the above-indicated diametric direction may be suitably determined depending upon the radius of arc of the recess and the radius of the center shaft member. However, the depth of the arcuate recess is desirable substantially equal to or smaller than the radius of arc of the recess, so as to prevent an excessive shearing and/or tensile stress of the rubber damper in the arcuate recess. With the depth and radius of arc of the arcuate recess being suitably determined, the distance between the end face of the stopper and the outer circumferential surface of the center shaft member can be made the shortest at the opposite ends of the arc of the arcuate recess, so that the stress of the rubber damper can be relatively uniformly distributed over its portion corresponding to the arcuate recess.

In a further preferred form of this invention, the first stopper has a peripheral surface which cooperates with an inner surface of the pressure-receiving chamber to define a flow restrictor through which the non-compressible fluid is forced to flow when the pressure-receiving chamber receives the vibrational load in the diametric direction. The elastic mount according to this form of the invention is capable of exhibiting an excellent damping effect based on the fluid flows through the flow restrictor, with respect to vibrations in a frequency range which is different from that of the vibrations that can be effectively damped on the basis of the fluid flows through the orifice passage.

In the above preferred form of the invention, the first stopper preferably includes a proximal portion relatively near the outer sleeve member, and a distal portion which has the above-indicated end face and which has a larger dimension than the proximal portion at least in the axial direction of the mount. In this instance, the flow restrictor is defined between a peripheral surface of the distal portion of the first stopper and an inner surface of the pressure-receiving chamber. This arrangement is effective to provide an improved damping effect based on the flows of the fluid through the flow restrictor.

In a yet further preferred form of the invention, the elastic body includes a rubber damper portion which covers portions of an outer circumferential surface of the center shaft member which are opposed to the first and second stoppers. The rubber damper portion functions to absorb an impact which arises upon abutting contact of the first and second stoppers with the above-indicated portions of the outer circumferential surface of the center shaft member.

BRIEF DESCRIPTION OF THE DRAWINGS

The above and optional objects, features, advantages and technical and industrial significance of this invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
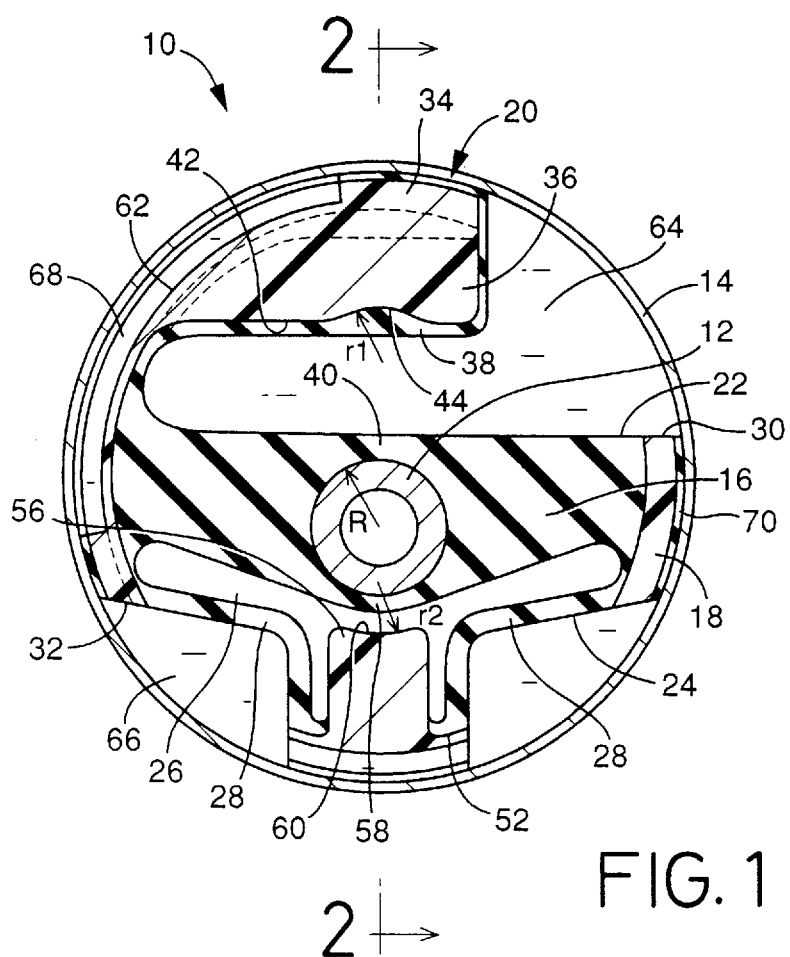
FIG. 1 is an elevational view in transverse cross section of one embodiment of a fluid-filled cylindrical elastic mount of the invention in the form of an engine mount, the view being taken along line 2—2 of FIG. 2.
Figure 2:
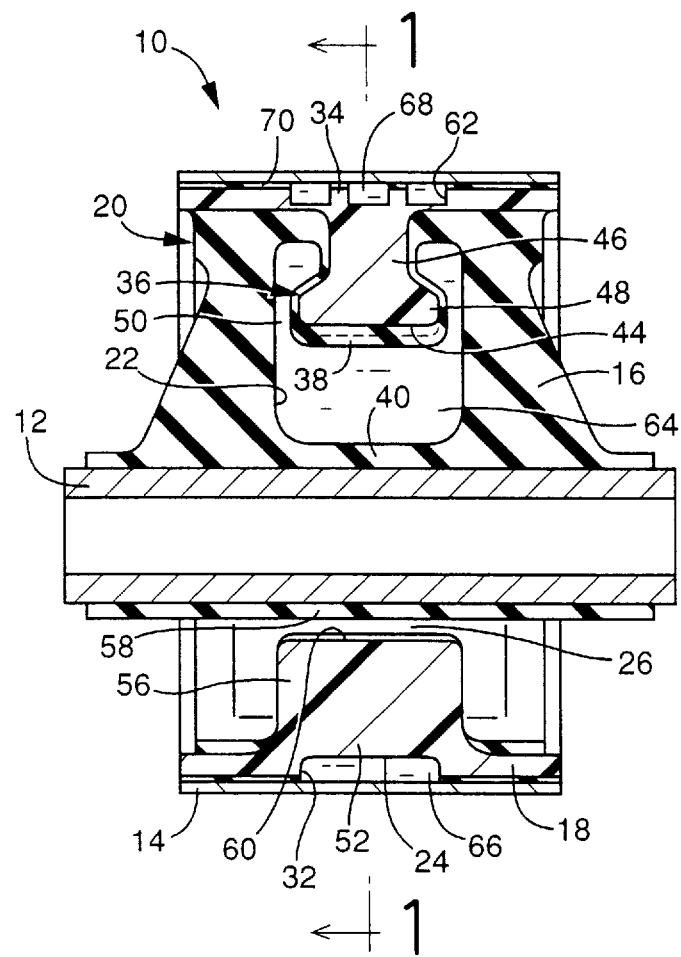
FIG. 2 is an elevational view in cross section taken along line 1—1 of FIG. 1.

Referring to FIGS. 1 and 2, there is shown a fluid-filled cylindrical engine mount 10 constructed according to one embodiment of this invention, for use on a front-engine front-drive motor vehicle. This engine mount 10 includes a center shaft member in the form of an inner sleeve 12 and an outer sleeve member in the form of an outer sleeve 14. These inner and outer sleeves 12, 14 are made of metal and are disposed such that the two sleeves 12, 14 are spaced apart from each other in a radial or diametric direction of the engine mount 10. The inner sleeve has an axis or center which is radially offset from the axis or center of the outer sleeve 14 by a given radial distance. The inner and outer sleeves 12, 14 are elastically connected to each other by an elastic body 16 interposed therebetween. When the engine mount 10 is installed on the motor vehicle, one of the inner and outer sleeves 12, 14 is attached to the body of the vehicle, while the other sleeve is attached to a power unit including an engine of the vehicle, so that the power unit is supported by the vehicle body in a vibration damping fashion. With the weight of the power unit acting on the engine mount 10, the elastic body 16 is elastically deformed so that the inner and outer sleeves 12, 14 are placed in a substantially coaxial or concentric relation with each other. The present engine mount 10 is constructed and oriented on the motor vehicle such that a vibrational load acts on the inner and outer sleeves 12, 14 primarily in the vertical direction (as seen in FIGS. 1 and 2), namely, in a diametric direction of the engine mount 10 in which the inner and outer sleeves 12, 14 are initially offset from each other (before installation of the engine mount 10 on the vehicle).

Described in detail, the inner sleeve 12 is made of a highly rigid metallic material such as steel, having a comparatively small diameter and a center bore. An intermediate sleeve 18 having a comparatively large diameter is disposed radially outwardly of the inner sleeve 12. Like the outer sleeve 14, the intermediate sleeve 18 is radially offset from the inner sleeve 12 by a given radial distance. The elastic body 16 indicated above has a generally annular shape and a relatively large wall thickness, and is interposed between the inner and intermediate sleeves 12, 18. The inner sleeve 12, intermediate sleeve 18 and elastic body 16 cooperate to constitute an intermediate sub-assembly 20, which is prepared by vulcanization of a unvulcanized rubber material for the elastic body 16 such that the inner sleeve 12 is bonded at its inner circumferential surface to the elastic body 16 while the intermediate sleeve 18 is bonded at its outer circumferential surface to the elastic body 16.

The elastic body 16 formed by vulcanization has a first pocket 22 and a second pocket 24 open in its outer circumferential surface. The first and second pockets 22, 24 are opposed to each other in the vertical direction as seen in FIG. 1 (in the radial offset direction of the inner and intermediate sleeves 12, 16). The circumferential dimension of each pocket 22, 24 as measured in the circumferential direction of the elastic body 16 is slightly smaller than a half of the circumference of the annular elastic body 16. The elastic body 16 further has a void 26 formed in one of two vertically opposed circumferential portions thereof at which the radial distance between the inner and intermediate sleeves 12, 16 is shorter. That is, the void 26 is formed in the lower one of the two circumferential portions which are diametrically opposed to each other in the offset direction or in the vertical direction as seen in FIGS. 1 and 2. The void 26 extends through the elastic body 16 over the entire axial length, so as to form a thin flexible diaphragm 28 which constitutes a bottom wall of the second pocket 24. The flexible diaphragm 28 is easily displaceable relative to the inner and intermediate sleeves 12, 18.

On the other hand, the intermediate sleeve 18 bonded to the outer circumferential surface of the elastic body 16 is an integral body formed of a hard synthetic resin such as polyamide resin, which is reinforced by a fiber. The intermediate sleeve 18 has a first window 30 and a second window 32 formed in respective circumferential portions thereof corresponding to the first and second pockets 22, 24 of the elastic body 16. The first and second pockets 22, 24 are open on the outer circumferential surface of the intermediate sub-assembly 20 (intermediate sleeve 18) through the first and second windows 30, 32, respectively.

The circumferential dimension of the first window 30 as measured in the circumferential direction of the intermediate sleeve 18 is determined to be not larger than a quarter of the entire circumferential of the intermediate sleeve 18. One of the circumferentially opposed edges of the opening of the first window 30 is defined by an arcuate portion 34 formed as an integral part of the intermediate sleeve 18. This arcuate portion 34 extends in the circumferential direction of the sleeve 18, from one of the circumferential ends of the first pocket 22 of the elastic body 16, which ends are opposed to each other in the circumferential direction of the elastic body 16. More precisely, the arcuate portion 34 extends from one of the above-indicated edges of the opening of the first pocket 22 toward the other edge. The circumferential dimension of the arcuate portion 34 of the intermediate sleeve 18 is slightly larger than a half of the circumferential dimension of the first pocket 22, so that the arcuate portion 34 closes or covers the first pocket 22 over a circumferential length slightly larger than the half of the circumferential dimension of the first pocket 22. In the presence of the arcuate portion 34 of the intermediate sleeve 18, the circumferential position of the opening of the first pocket 22 in the circumferential direction of the elastic body 16 is not aligned or centered on a straight line passing the axis of the inner sleeve 12 in the offset direction of the inner and intermediate sleeves 12, 18. That is, the circumferential position at which the first pocket 22 is open on the outer circumferential surface of the intermediate sub-assembly 20 is offset from the above-indicated straight line. In other words, the opening of the first pocket 22 is partially closed by the arcuate portion 34 in the circumferential direction of the elastic body 16.

The arcuate portion 34 of the intermediate sleeve 18 has a first stopper 36 formed integrally on its inner surface, at an axially intermediate part of the sleeve 18. The first stopper 36 extends into the first pocket 22 toward the inner sleeve 12, and has a suitable height or radial dimension, as shown in FIG. 2. The first stopper 36 has an end face 42 opposed to the bottom of the first pocket 22 or the inner sleeve 12. The end face 42 is covered by a rubber damper 38, while the bottom wall of the first pocket 22 serves a rubber damper 40 covering the appropriate part of the outer circumferential surface of the inner sleeve 12. These rubber dampers 38, 40 are formed integrally with the elastic body 16.

The end face 42 of the first stopper 36 is a flat surface which is perpendicular to the vertical straight line which passes the axis of the inner sleeve 12. This flat end face 42 has an arcuate recess 44 aligned with the above-indicated vertical straight line, as indicated in FIG. 1. The arcuate recess 44 is formed over the entire length of the first stopper 36 in the axial direction of the intermediate sleeve 18, as indicated in FIG. 2. The recess 44 takes the form of an arc in cross section, which has a center on the above-indicated vertical straight line. The arcuate recess 44 has a radius of arc r1 slightly smaller than a radius R of the inner sleeve 12. However, the end portions of the arc of the arcuate recess 44 are contiguous with curved surfaces which smoothly terminate into the flat surface (42).

The first stopper 36 is generally T-shaped in cross section, having a radially outer proximal portion 46, and a radially inner distal portion 48 which has a larger axial dimension than the proximal portion 46, as indicated in FIG. 2. The outer surface of the distal portion 48 cooperates with the inner surface of the first pocket 22 to define a flow restrictor or restricted fluid passage indicated at 50 in FIG. 2.

The intermediate sleeve 18 further has a bridging portion 52 extending in its axial direction between the axially opposite edges of the opening of the second window 32, such that the bridging portion 52 divides the second window 32 into two sections spaced apart from each other in the circumferential direction of the intermediate sleeve 18. The bridging portion 52 is located at an intermediate portion of said second window 32 as viewed in the circumferential direction of the sleeve 18, as shown in FIG. 1, and has a suitable circumferential dimension. Accordingly, the bridging portion 52 is aligned with an intermediate portion of the second pocket 24 of the elastic body 16 as viewed in the circumferential direction of the sleeve 18. The flexible diaphragm 28 extending from the elastic body 16 is bonded at its intermediate portion to the bridging portion 52. In other words, the flexible diaphragm 28 which forms the bottom of the second pocket 24 is supported at its intermediate portion by the bridging portion 52 of the intermediate sleeve 18. The bridging portion 52 has a diameter slightly smaller than that of the other portion of the intermediate sleeve 18, so that the bridging portion 52 is spaced apart from the outer sleeve 14 by a suitable distance in the radially inward direction.

The bridging portion 52 has a second stopper 56 integrally formed on its inner surface, so as to cooperate with the flexible diaphragm 28 and the elastic body 16 to define the axial void 26. In other words, the second stopper 56 extends into the void 26 toward the inner sleeve 12, and has a suitable height or radial dimension, as shown in FIG. 2. The second stopper 56 has an end face opposed to the the inner sleeve 12. The end face of the second stopper 56 is covered by a rubber damper 58 formed integrally with the elastic body 16.

The end face of the second stopper 56 has a second arcuate recess 60, which is formed over the entire length of the second stopper 56 in the axial direction of the intermediate sleeve 18, as indicated in FIG. 2. The recess 60 takes the form of an arc in cross section, which has a center on the vertical straight line which passes through the axis of the inner sleeve 12. The arcuate recess 60 has a radius of arc r2 smaller slightly than the radius R of the inner sleeve 12. However, the end portions of the arc of the arcuate recess 60 are contiguous with curved surfaces which smoothly terminate into the side surfaces of the second stopper 56.

Figure 3:
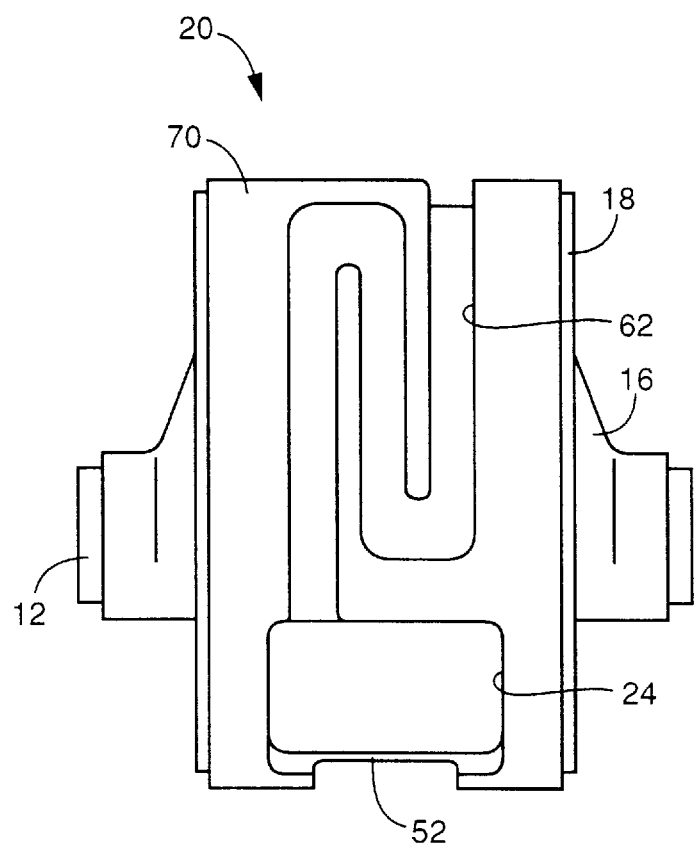
FIG. 3 is a side elevational view of an intermediate sub-assembly prepared during manufacture of the engine mount of FIG. 1.

The intermediate sleeve 18 has a U-groove 62, formed in a circumferential portion of the outer circumferential surface thereof between the first and second windows 30, 32, which circumferential portion includes the arcuate portion 34 described above. The U-groove 62 has a cross sectional shape in the form of letter "U", as indicated in FIG. 2, and extends between the adjacent circumferential ends or edges of the first and second windows 30, 32, as indicated in FIG. 1. One of the opposite ends of the U-groove 62 communicates with the first pocket 22, while the other end of the U-groove 62 communicates with the second pocket 24, as indicated in FIGS. 1 and 3. The U-groove 62 is formed in a serpentine pattern, as shown in FIG. 3, in the above-indicated circumferential portion of the outer circumferential surface of the intermediate sleeve 18, so that the U-groove 62 has a relatively large length.

The outer sleeve 14 is fitted on the outer circumferential surface of the intermediate sub-assembly 20 constructed as described above. The outer sleeve 14 is subjected to a drawing operation so as to radially inwardly compress the sub-assembly 20, whereby the engine mount 10 is obtained. In the thus produced engine mount 10, the openings of the first and second windows 30, 32 and the U-groove 62 are fluid-tightly closed by the inner circumferential surface of the outer sleeve 14, so that the engine mount 10 has a pressure-receiving chamber 64 corresponding to the first pocket 22, an equilibrium chamber 66 corresponding to the second pocket 24, and an orifice passage 68 which corresponds to the U-groove 60 and which communicates with the pressure-receiving and equilibrium chambers 64, 66 for fluid communication therebetween. These chambers 64, 66 and orifice passage 68 are filled with a suitable non-compressible fluid such as water or alkylene glycol. The bridging portion 52 provided in the circumferential central portion of the second window 32 of the intermediate sleeve 18 is radially spaced from the outer sleeve 14 by a given distance, so that a space between the outer sleeve 12 and the bridging portion 34 forms a part of the equilibrium chamber 66. The chambers 64, 66 and orifice passage 68 can be suitably filled with the non-compressible fluid by assembling the outer sleeve 12 and the intermediate sub-assembly 20 within a mass of the fluid. The chambers 64, 66 and orifice passage 68 are given fluid tightness by a relatively thin sealing rubber layer 70 formed on the outer circumferential surface of the intermediate sleeve 18, which layer 70 is compressed by and between the outer and intermediate sleeves 14, 18 by the drawing operation indicated above.

Upon application of a vibrational load to the present engine mount 10 installed on a motor vehicle, the pressure of the fluid in the pressure-receiving chamber 64 varies due to elastic deformation of the elastic body 16 which partially defines the chamber 64. On the other hand, the flexible diaphragm 28 which partially defines the equilibrium chamber 66 is elastically displaceable, permitting an easy volume change of the equilibrium chamber 66. When the inner and outer sleeves 12, 14 are radially displaced relative to each other due to the input vibrational load, there arises a difference between the fluid pressures in the pressure-receiving and equilibrium chambers 64, 66, which causes the fluid to flow through the orifice passage 68 between the two chambers 64, 66, whereby the vibrational load is damped or attenuated based on resonance of the fluid flowing through the orifice passage 68. In the present embodiment, the length and cross sectional area of fluid communication of the orifice passage 68 are determined or "tuned" so as to provide a sufficiently high damping effect with respect to engine shakes of the vehicle and other vibrations of relatively low frequencies. In tuning the orifice passage 68, appropriate factors such as the stiffness of the elastic body 16 are taken into account.

Where the frequency of the vibrational load applied to the engine mount 10 is higher than the frequency to which the orifice passage 68 is tuned to provide a sufficient damping effect, the resistance to flows of the fluid through the orifice passage 68 is considerably increased, and the orifice passage 68 is not able to assure a high damping effect with respect to the vibrational load of higher frequency. In the present engine mount 10 wherein the first stopper 36 is provided in the pressure-receiving chamber 64, the fluid is forced to flow through the flow restrictor 50 due to radial displacement of the first stopper 46 within the pressure-receiving chamber 64, which takes place due to the higher frequency vibration. Accordingly, the higher frequency vibration can be effectively damped based on resonance of the fluid flowing through the flow restrictor 50. In the present embodiment, the length (along the periphery of the distal portion 48) and cross sectional area of fluid communication of the flow restrictor 50 are "tuned" so as to provide a sufficiently high damping effect with respect to engine idling vibrations and other vibrations of the vehicle having relatively high frequencies. In tuning the flow restrictor 50, too, the stiffness of the elastic body 16 and other factors are taken into account.

When an excessively large vibrational load is applied to the engine mount 12, the inner sleeve 10 is brought into abutting contact with the first stopper 36 through the rubber dampers 38, 40, and with the second stopper 56 through the rubber damper 58. Thus, the first stopper 36 functions as a bound stopper while the second stopper 56 functions as a rebound stopper, whereby the amount of radial displacement of the inner and outer sleeves 12, 14 is limited, to thereby limit the amount of displacement of the power unit relative to the vehicle body.

In the present engine mount 10 constructed as described above, the first and second stoppers 36, 56 for abutting contact with the inner sleeve 12 in the bound and rebound directions of the input vibration are formed as integral parts of the intermediate sleeve 18, thus eliminating a separate exclusive stopper member. This arrangement is effective to reduce the number of the required components of the engine mount 10 having the stopper function, simplify its construction and facilitate its manufacture.

Further, the-U-groove 62 partially defining the orifice passage 68 is formed in the intermediate sleeve 18 made of a synthetic resin, more specifically, in the circumferential portion of the outer circumferential surface of the intermediate sleeve 18 which includes the arcuate portion 34. This arrangement permits the orifice passage 68 to have a sufficiently large length, and provides a relatively high degree of freedom in tuning the orifice passage 68. Further, the present arrangement is effective to maintain the intended or desired cross sectional area and shape of the orifice passage 68, with a sufficient degree of rigidity of the wall defining the orifice passage 68, whereby the engine mount 10 is capable of exhibiting a stable damping effect based on the fluid flows through the orifice passage 68.

In addition, the flow restrictor 50 provided in the pressure-receiving chamber 64 is formed by utilizing the first stopper 36 formed integrally with the intermediate sleeve 18. Accordingly, the engine mount 10 is made simple in construction, yet is capable of exhibiting a desired damping effect with respect to vibrations having comparatively high frequencies, without an exclusive member adapted for damping such high frequency vibrations.

It is further noted that the first and second stoppers 36, 56 provided in the present embodiment have the respective first and second arcuate recesses 44, 60 formed at appropriate portions of the end faces which are opposed to the inner sleeve 12 in the bound and rebound directions of the input vibrational load, namely, in the direction in which the vibrational load acts on the engine mount 10. The radii r1, r2 of the arcs or curvatures of these arcuate recesses 44, 60 are almost equal to but are slightly smaller than the radius R of the inner sleeve 12. The provision of the arcuate recesses 44, 60 results in increasing the surface areas of uniform abutting contact of the end faces of the stoppers 36, 56 with the outer circumferential surfaces of the inner sleeve 12 via the rubber dampers 38, 40, 58. If these arcuate recesses 44, 60 were not provided, the distances between the end faces of the stoppers 36, 56 and the outer circumferential surface of the inner sleeve 12 are the shortest at the central portions of the end faces of the stoppers 36, 56, in the diametric direction in which the vibrational load is received. Accordingly, the amount of compression of the rubber dampers 38, 40, 58 is the largest at their corresponding central portions. In the present embodiment in which the radii r1 and r2 are slightly smaller than the radius R of the inner sleeve 12, the distances between the end faces of the stoppers 36, 56 and the outer circumferential surface of the inner sleeve 12 is slightly larger at the central portions of the end faces of the stoppers 36, 56 than at the other portions near the ends of the arcs of the arcuate recesses 44, 60. Accordingly, the compressive stresses of the rubber dampers 38, 40, 58 are not concentrated at their portions corresponding to the central portions of the end faces of the stoppers 36, 56, and are substantially evenly distributed over the entire areas of contact of the rubber dampers 38, 40, 58 with the surfaces of the arcuate recesses 44, 60. It is further noted that the rubber dampers 40, 58 formed on the inner sleeve 12 have larger thickness values at the portions corresponding to the end portions of the arcs of the arcuate recesses 44, 60. This arrangement is effective to prevent compressive stress concentration of the rubber dampers 38, 40, 58 at their portions corresponding to the central portions of the end faces of the stoppers 36, 56.

As explained above in detail, the present engine mount 10 is adapted to prevent excessive local stresses or stress concentration of the rubber dampers 38, 40, 58 upon abutting contact of the first and second stoppers 36, 56 with the inner sleeve 12 through those rubber dampers, whereby the rubber dampers are protected against structural damages, and the durability of the rubber dampers is accordingly increased.

While the presently preferred embodiment of this invention has been described above in detail by illustrative purpose only, it is to be understood that the invention is not limited to the details of the illustrated embodiment, but may be otherwise embodied.

For instance, the configuration and dimensions of the U-groove 62 for forming the orifice passage 68 may be suitably modified depending upon the specific operating characteristics desired of the fluid-filled elastic mount. Although the U-groove 62 in the illustrated embodiment is serpentine, a groove for forming an orifice passage connecting the pressure-receiving and equilibrium chamber need not have turns, and may be formed straight in the circumferential direction between the first and second pockets 22, 24 of the elastic body 16.

While the first stopper 36 has the distal portion 48 larger than the proximal portion 46 so as to provide the flow restrictor 50 between the proximal portion 46 and the inner wall surface of the pressure-receiving chamber 64, the first stopper 36 need not have such a larger distal portion, provided a flow restricting gap is provided between the first stopper 36 and the inner wall surface of the chamber 64.

The arcuate recesses 44, 60 formed in the end faces of the stoppers 36, 56 in the illustrated embodiment are not essential. Where such recesses are provided, these recesses need not have a smaller radius than the radius of the inner sleeve.

In the illustrated embodiment, the arcuate portion 34 of the intermediate sleeve 18 has an axial dimension substantially equal to the entire axial dimension of the first window 30. However, the axial dimension of the arcuate portion 34 may be smaller than the entire axial dimension of the first window 30. For instance, the arcuate portion 34 may be formed so as to close only an axially central part of the first pocket 22, so that the axially end parts of the first pocket 22 are open through the intermediate sleeve 18.

While the illustrated embodiment of this invention takes the form of the engine mount 10 for a motor vehicle, the principle of the invention is equally applicable to various types of fluid-filled cylindrical elastic mount such as differential mounts, body mounts and suspension bushings for motor vehicles, and fluid-filled dampers used in devices and equipment other than the motor vehicles.

It is to be understood that the present invention may be embodied with various other changes, modifications and improvements, which may occur to those skilled in the art, without departing from the spirit and scope of the invention defined by the following claims.

What is claimed is:

1. A fluid-filled cylindrical elastic mount including (a) a center shaft member, (b) an intermediate sleeve member disposed radially outwardly of said center shaft member and having a first and a second window, (c) a generally annular elastic body interposed between said center shaft member and said intermediate sleeve member for elastically connecting said center shaft member and said intermediate sleeve member, said elastic body having a first pocket and a second pocket formed at respective circumferential positions thereof that are opposed to each other in a diametric direction thereof, said first and second pockets being open on an outer circumferential surface of said intermediate sleeve member through said first and second windows, respectively, (d) an outer sleeve member fitted on said intermediate sleeve member so as to close said first and second windows, and cooperating with said first pocket to define a pressure-receiving chamber which is filled with a non-compressible fluid and which receives a vibrational load in said diametric direction, (e) a flexible diaphragm cooperating with said second pocket to define an equilibrium chamber which is filled with said fluid and whose volume is variable, and (f) means for defining an orifice passage for fluid communication between said pressure-receiving and said equilibrium chambers, and wherein said elastic body has a void formed through a portion thereof between said center shaft member and said equilibrium chamber, over an entire axial length of said elastic body, wherein an improvement comprises:

said intermediate sleeve member being made of a synthetic resin, and including an arcuate portion which extends in a circumferential direction of said intermediate sleeve member, from one of opposite ends of said first pocket which are opposed to each other in said circumferential direction, toward the other of said opposite ends, said arcuate portion defining one of opposite edges of an opening of said first window which corresponds to said one end of said first pocket;

said arcuate portion including a first stopper formed as an integral part thereof, said first stopper extending from an inner surface of said arcuate portion into said pressure-receiving chamber in said diametric direction and being spaced from said center shaft member by a first predetermined distance in said diametric direction;

said intermediate sleeve member further including a bridging portion which extends in an axial direction of said intermediate sleeve member between axial opposite edges of an opening of said second window, said bridging portion being located at an intermediate portion of said second pocket as seen in said circumferential direction of said intermediate sleeve member, and being inwardly spaced apart from said outer sleeve member in said diametric direction; and said bridging portion including a second stopper formed as an integral part thereof, said second stopper extending from an inner surface of said bridging portion into said void in said diametric direction and being spaced from said center shaft member by a second predetermined distance in said diametric direction, said first and second stoppers being disposed on opposite sides of said center shaft member as seen in said diametric direction.

2. A fluid-filled cylindrical elastic mount according to claim 1, wherein said means for defining an orifice passage includes a circumferential portion of said intermediate sleeve member which includes said arcuate portion and which has a groove formed on an outer surface thereof and communicating with said pressure-receiving and equilibrium chambers, said means further including said outer sleeve member which closes an opening of said groove so as to provide said orifice passage.

3. A fluid-filled cylindrical elastic mount according to claim 1, wherein at least one of said first and second stoppers has an arcuate recess formed on an end face thereof which is opposed to an outer circumferential surface of said center shaft member, said arcuate recess extending over an entire length of each of said at least one of said first and second stoppers in an axial direction of said intermediate sleeve member, and having a radius of arc smaller than a radius of said center shaft member.

4. A fluid-filled cylindrical elastic mount according to claim 1, wherein said first stopper has a peripheral surface which cooperates with an inner surface of said pressure-receiving chamber to define a flow restrictor through which said non-compressible fluid is forced to flow when said pressure-receiving chamber receives said vibrational load in said diametric direction.

5. A fluid-filled cylindrical elastic mount according to claim 1, wherein said elastic body includes a rubber damper portion which covers portions of an outer circumferential surface of said center shaft member which are opposed to said first and second stoppers.

6. A fluid-filled cylindrical elastic mount according to claim 1, wherein said flexible diaphragm partially defines said void and is bonded at an intermediate portion thereof to said bridging portion of said intermediate sleeve member.

7. A fluid-filled cylindrical elastic mount according to claim 1, wherein said arcuate portion of said intermediate sleeve member has a circumferential dimension not smaller than a half of a circumferential dimension of said first pocket of said elastic body as measured in said circumferential direction of said intermediate sleeve member.

8. A fluid-filled cylindrical elastic mount according to claim 1, wherein said intermediate sleeve member is made of a fiber-reinforced polyamide resin.

9. A fluid-filled cylindrical elastic mount according to claim 2, wherein said groove is formed in a serpentine pattern in said outer circumferential surface of said circumferential portion of said intermediate sleeve member.

10. A fluid-filled cylindrical elastic mount according to claim 1, wherein said first stopper has an arcuate recess formed on an end face thereof which is opposed to an outer circumferential surface of said center shaft member, said first stopper further having a rubber damper which covers said end face.

* * * * *

UNITED STATES PATENT AND TRADEMARK OFFICE
CERTIFICATE OF CORRECTION

PATENT NO. : 5,813,665
DATED : September 29, 1998
INVENTOR(S) : Ryouji KANDA

It is certified that error appears in the above-indentified patent and that said Letters Patent is hereby corrected as shown below:

On the title page, column 1, [73], line 1, change "Tokai Rubber Technologies, Ltd." to --Tokai Rubber Industries, Ltd.--.

Signed and Sealed this

Ninth Day of March, 1999

Attest:

Attesting Officer

Q. TODD DICKINSON

Acting Commissioner of Patents and Trademarks